(12) United States Patent
Dangtran et al.

(10) Patent No.: US 6,375,909 B1
(45) Date of Patent: Apr. 23, 2002

(54) METHOD FOR THE REMOVAL OF MERCURY AND NITROGEN OXIDES FROM COMBUSTION FLUE GAS

(75) Inventors: Ky Dangtran; Troy C. Holst, both of Richmond, VA (US)

(73) Assignee: Infilco Degremont Inc., Richmond, VA (US)

(*) Notice: Subject to any disclaimer, the term of this patent is extended or adjusted under 35 U.S.C. 154(b) by 0 days.

(21) Appl. No.: 09/661,042

(22) Filed: Sep. 14, 2000

(51) Int. Cl.⁷ .............................................. C01B 21/00

(52) U.S. Cl. ................... 423/235; 423/240 R; 423/210; 423/99; 423/481; 423/491; 75/710; 75/711

(58) Field of Search .............................. 423/235, 240 R, 423/210, 99, 481, 491; 75/710, 711

(56) References Cited

U.S. PATENT DOCUMENTS

| | | | |
|---|---|---|---|
| 5,435,980 A | * | 7/1995 | Felsvang et al. ............ 423/210 |
| 5,607,496 A | * | 3/1997 | Brooks ........................ 75/670 |
| 6,136,281 A | * | 10/2000 | Meischen et al. ........... 423/210 |

* cited by examiner

Primary Examiner—Steven P. Griffin
Assistant Examiner—Edward M. Johnson
(74) Attorney, Agent, or Firm—Schnader Harrison Segal & Lewis LLP

(57) ABSTRACT

The process is by injection of calcium chloride into the combustor and lowering the flue gas temperature in sufficient time to enhance oxidation of mercury and nitrogen oxides into more soluble products prior to their absorption in a wet scrubber. The additive also increases the alkalinity and the pH of the scrubber water, therefore, favorably increasing the absorption of the pollutants. The flue gas is then cooled to ambient temperature or less to enhance the removal of mercury.

25 Claims, 7 Drawing Sheets

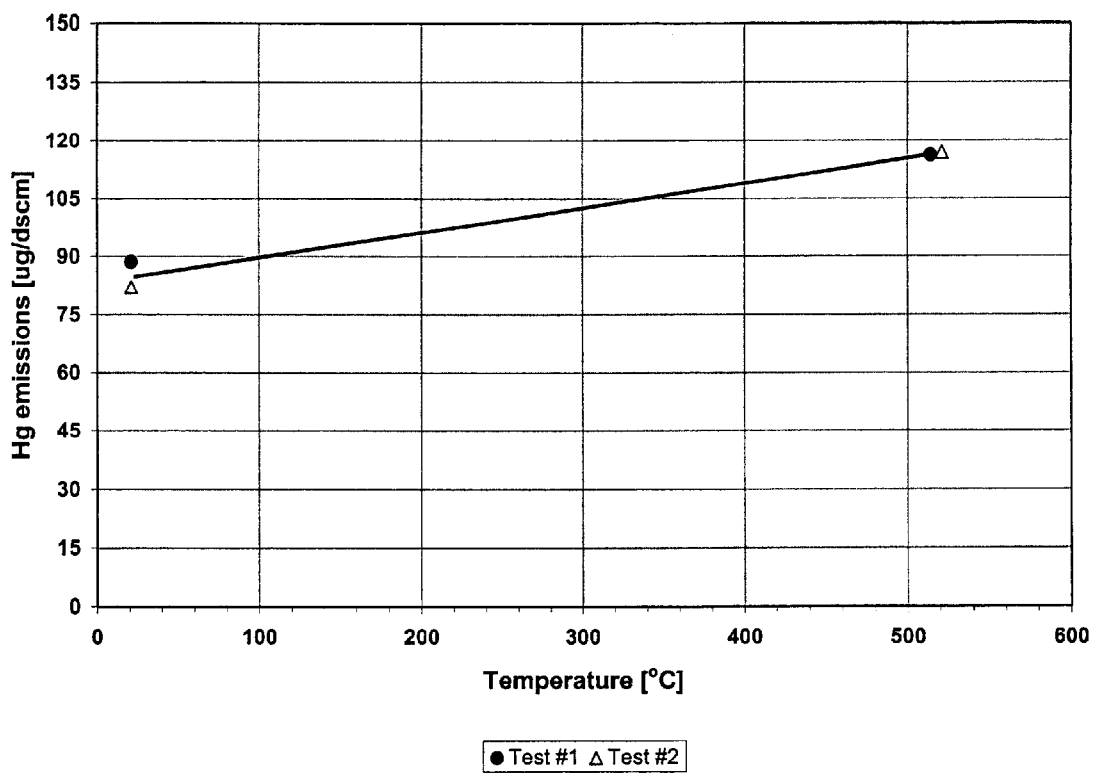
Figure 3: Reduction of Hg emissions by 27% as the flue gas temperature decreases from 518°C to 21°C.

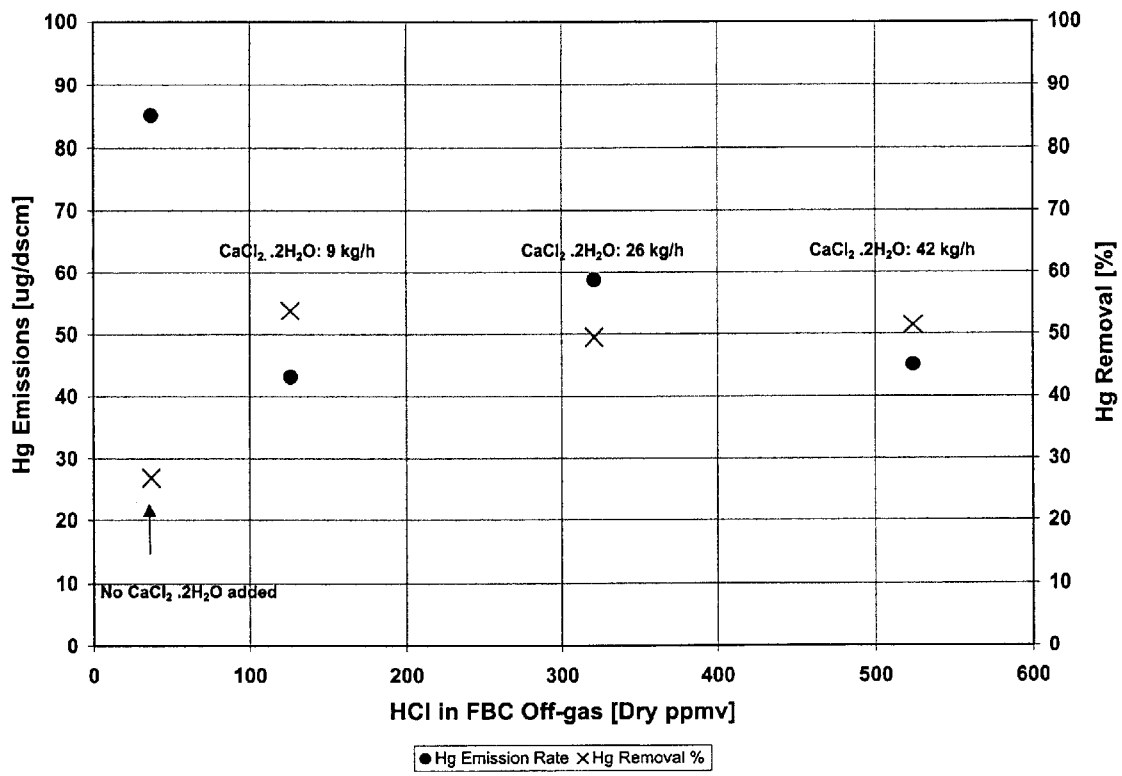
Figure 4: Hg emissions and removal rate in function of HCl concentration in the flue gas.

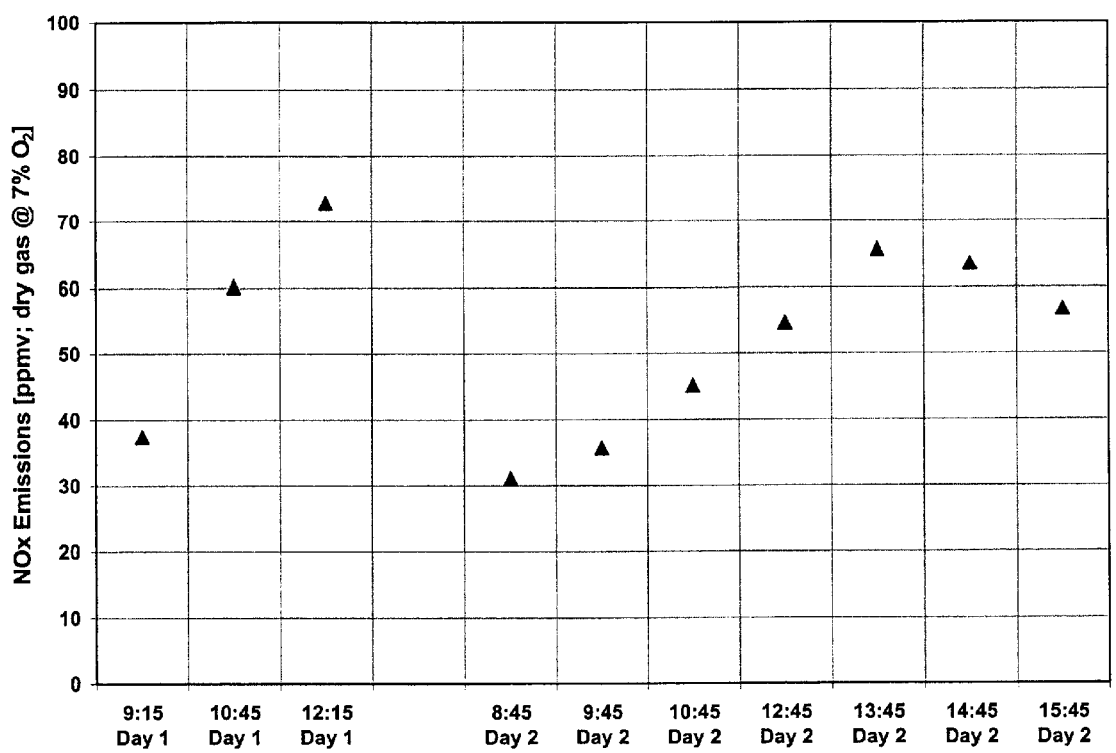
Figure 5. NOx emissions during normal operating conditions.

Figure 6: NOx emissions while calcium chloride is added to feed sludge.
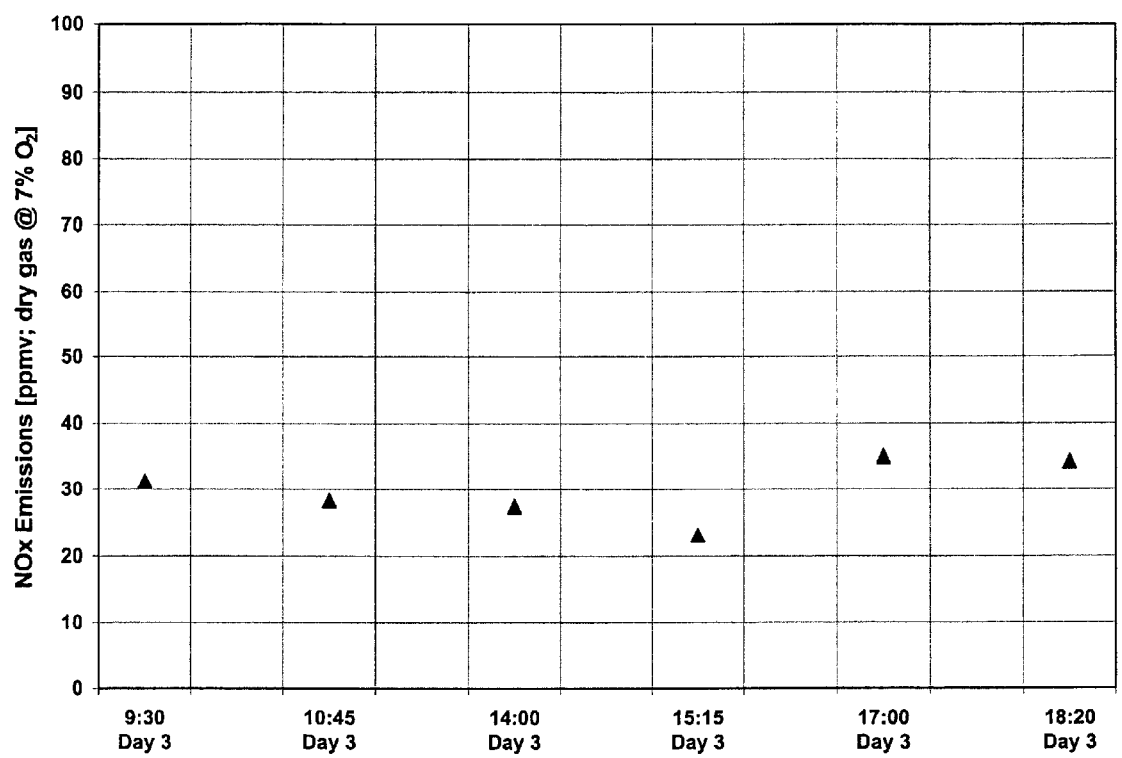

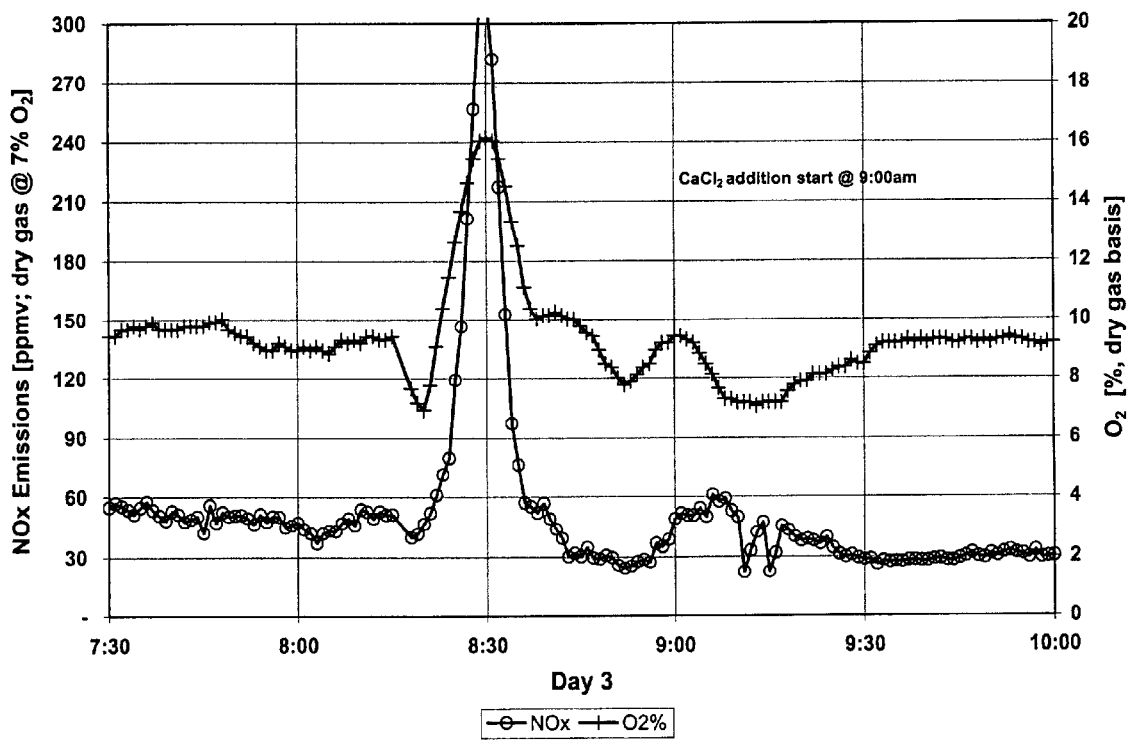
Figure 7: NOx emissions and O₂ content of flue gas in function of time; before and after addition of calcium chloride.

METHOD FOR THE REMOVAL OF MERCURY AND NITROGEN OXIDES FROM COMBUSTION FLUE GAS

FIELD OF THE INVENTION

This invention relates to removal of both mercury (Hg) and nitrogen oxides ($NO_x$) from exhaust gas generating from combustion of carbonaceous materials and apparatus for effecting such removal.

BACKGROUND OF THE INVENTION

Among the 189 substances listed as hazardous air pollutants in the Clean Air Act Amendments (CAAA) of 1990, mercury is a metal species of great concern due to its extreme toxicity and the risk that it can cause to humans and animals if released to the environment. In several countries, legislation is being prepared to limit the emission of mercury to the atmosphere. While most of the trace metals can be efficiently removed in today's air pollution control system, mercury is present mainly in its vapor phase and is difficult and expensive to remove.

In the US, the EPA maximum achievable control technology (MACT) will limit mercury emissions to 40–110 $\mu$g/dscm at 7%$O_2$ for hazardous waste incinerator. For municipal sewage sludge combustor, federal regulation (40CFR Part 61, Subpart E) limits mercury emissions to 3,200 grams per 24 hours.

Nitrogen oxides ($NO_x$) are also an environmental problem because they can initiate reactions resulting in the production of ozone and acid rain. These pollutants can harm forests and lakes, damage buildings and cause health problems. Guidelines for controlling $NO_x$ emissions are provided in the 1990 CAAA under the "Nitrogen Oxides Emission Reduction Program" and "Ozone Non-Attainment Program". For municipal sewage sludge combustors, $NO_x$ is not regulated at the Federal level yet. However, as a result of the 1990 CAAA, Federal regulation on $NO_x$ is anticipated. Consequently, $NO_x$ emission from municipal sewage sludge combustors can be limited to the MACT standard, which is no more than the average emissions achieved by the best performing 12% of all operating incinerators. Most state authorities already regulate $NO_x$ emissions for their municipal sewage sludge combustors and have very stringent limits.

Of the different technologies available for reducing $NO_x$ and Hg, most require additional equipment and the use of expensive and/or hazardous chemicals. Therefore, it would be advantageous to develop a method for removing these compounds utilizing only the standard pollution control equipment and cost efficient non-hazardous chemicals, thereby meeting strict emission limits economically.

A number of different methods have been proposed to reduce mercury and/or $NO_x$ emissions from combustor exhaust gas. However, the majority of these processes are more sophisticated due to either the extension of additional equipment or the hazardous nature of the additives. Very few of those methods propose simultaneous reduction of both mercury and nitrogen oxides.

Mercury Removal:

The chemical form of Hg in the gas to be treated is of considerable interest. Ionic mercury is removed with control processes that employ various aqueous scrubbing techniques. Elemental mercury, however, is essentially unaffected by wet scrubbers and requires some type of sorbent or carbon injection process.

Mercury typically can be removed from the combustor exhaust gas in two ways, (1) adsorption via sorbent injection into the exhaust gas or via flow through fixed sorbent bed at low temperature upstream of a particulate matter collector, and (2) wet scrubbing with conversion of the elemental mercury into a more soluble species that can be easily absorbed in a scrubber.

WO 9,517,240 describes a method for improving mercury removal capability of a flue gas purification system by introducing sulfur vapors into the flue gas stream where admixed flue gases and sulfur vapors contact solid particulate (calcium hydroxide) materials in the flue gas. Calcium hydroxide adsorbs mercury and sulfur vapors and catalyzes reactions forming solid products comprising mercury. The solid products comprising mercury are separated, thereby forming a purified flue gas stream. The solid particulate materials are formed in situ by reaction in a spray dryer between an aqueous dispersion of calcium hydroxide and the acidic materials in the flue gas at a temperature between 70 and 170° C.

U.S. Pat. No. 4,889,698 discloses a process in which powdery activated carbon is injected immediately before, during or after an alkali reagent (limestone or sodium carbonate) spray dryer for simultaneous removal of acid gases and trace contaminants such as mercury. The process requires cooling the flue gas by spray drying in the presence of large amounts of alkali sorbent material together with the activated carbon to enhance overall mercury removal.

U.S. Pat. No. 5,695,726 discloses a process in which toxic mercury vapor is removed from combustion gas by contact with dry alkaline material and dry activated carbon in a reaction chamber followed by solids separation. The adsorptive capacity of activated carbon decreases with increasing gas temperature. US '726 emphasizes that a minimum level of HCl is necessary and a low temperature of the reaction chamber of from about 175° C. to about 235° C. are important for achieving high removal of the mercury. HCl is needed in the gas phase to react with elemental mercury or mercury oxide to convert them to chlorides. US '726 also teaches that in the combustion of the wastes that are chlorine-deficient, an HCl-generating material such as scrap polyvinyl chloride plastic can be added to the chlorine-deficient waste prior to incineration. However, it is well known that adding chlorine to the waste stream and at the same time lowering the flue gas to the temperature range of 200° C.–350° C. are the two most favorable conditions for the synthesis or reformation of dioxins and furans.

U.S. Pat. No. 5,900,042 describes a process to remove elemental mercury from a gas stream by reacting the gas stream with an oxidizing solution to convert the elemental mercury to soluble mercury compounds. The gas stream is then passed through a wet scrubber to remove the mercuric compounds and oxidized constituents. The oxidizing solutions are solutions of aqueous iodine, aqueous bromine, aqueous chlorine, aqueous chloric acid and alkali metal chlorate and others.

U.S. Pat. No. 5,607,496 discloses a removal process, in which the elemental mercury of the combustion gas is first catalytically oxidized to form a mercury compound, and then the mercury compound is either adsorbed on adsorbent particles such as alumina or removed from the gas stream by scrubbing. The catalysts include mostly oxides of existing heavy metals in the combustion gas such as manganese, vanadium, lead, chromium, iron, cobalt, nickel and selenium.

UK Patent No. 1,336,084 discloses a process in which mercury vapour in the flue gas is removed by scrubbing the flue gas with a solution of alkaline earth metal hypochlorite containing an alkali metal chloride or alkaline earth metal chloride in excess of the chemical equivalent of the alkaline earth metal hypochlorite at a pH in the range of 8 to 12.

Nitrogen Oxides Removal:

Nitrogen oxides can be removed from combustor exhaust gas by selective catalytic reduction (SCR), selective non catalytic reduction (SNCR), and wet flue gas denitrification.

U.S. Pat. No. 4,220,632 discloses a process in which ammonia is used to reduce nitrogen oxides in combustion exhaust gas in the presence of a catalyst by SCR. High performance can be achieved with this technique, but it requires injection of ammonia into the exhaust gas prior to entering the SCR reactor. Sometimes it is necessary to first pass through a wet removal process to eliminate dust and poisonous chemicals that hinder the SCR process, then reheat the gas for the SCR. This method requires space due to the extent of the treatment equipment and generates a potential hazardous spent catalyst. Therefore, both capital and operating costs are high.

U.S. Pat. No. 3,900,554 describes a process called selective non-catalytic reduction (SNCR) in which ammonia is used to reduce nitrogen oxide from combustion effluents. Application of the technique is limited, because excessive unreacted ammonia or ammonia slip can not only add to the pollution, but also cause pluggage of the downstream equipment.

U.S. Pat. No. 4,719,092 describes another SNCR process but, instead of ammonia, urea is injected in the post combustion zone at a temperature between 850–950° C. This reductant reagent is oxidized to ammonia, which then reacts with $NO_x$ to produce $N_2$, water vapor and $CO_2$. The technique claims better control of ammonia slip than the technique using ammonia. Maintaining a close temperature control is critical and difficult under this technique.

Since the majority of $NO_x$ in the off-gas is in the form NO, which has a very low solubility in water ($k_0^H$=0.0019 [mol/kg.bar] @ 298.15° K.), it is difficult to reduce the amount of $NO_x$ in standard wet scrubbing pollution control equipment. However, if the NO can be oxidized to a higher state such as $NO_2$ or $NO_3$, and/or formed into another compound which has a higher solubility ($NO_2$: $k_0^H$= 0.01–0.04 [mol/kg.bar] @ 298.15° K.; $NO_3$: $k_0^H$=0.6–12.0 [mol/kg.bar] @ 298.15° K.), then a larger amount of $NO_x$ can be removed.

U.S. Pat. No. 4,035,470 describes a process to remove both sulfur oxides and nitrogen oxides from the exhaust gas by adding ozone ($O_3$) or chlorine dioxide ($ClO_2$) to the exhaust gas and by scrubbing the exhaust gas with an aqueous scrubbing solution. $O_3$ or $ClO_2$ are good oxidants and are capable to convert NO in the gas phase to more soluble forms such as $NO_2$ or $N_2O_5$. However, $O_3$ is expensive and $ClO_2$ is difficult to store and is hazardous.

U.S. Pat. No. 4,294,928 describes a liquid phase process using chlorine as oxidant in the presence of water in the scrubbing system. It has been claimed that the oxidation of nitric oxide to other oxides of nitrogen proceeds over a wide range of temperatures of the aqueous solution. A nitric oxide reduction of over 90% has been achieved at a temperature between 10° C. and 50° C.

JP 63-100,918 discloses a method of removing both mercury and nitrogen oxides from exhaust gas by washing the exhaust gas in a washing column using a solution comprising alkali and hypochlorite or chlorite.

EP 0 962,247 discloses a process of removing both $NO_x$ and $SO_x$ from a gaseous effluent by passing the gaseous effluent through an aqueous alkaline scrubber. The pH of the scrubber should be between 7 and 14, but is preferably very basic, i.e. between pH 10 and 14.

SUMMARY OF THE INVENTION

The present invention discloses an economical and simple method to remove both mercury and/or nitrogen oxides from combustion gas.

It has been found that calcium chloride added to the feed of the combustor promote the gas phase oxidation of elemental mercury to a more soluble form mercuric chloride, which can then be separated from the flue gas in a typical wet scrubber.

It has been found that calcium chloride added to the feed of the combustor promote gas phase and/or liquid phase oxidation of nitrogen monoxide which comprises the majority of flue gas $NO_x$ to a more soluble form of nitrogen oxides ($NO_2$, $NO_3$, $N_2O_5$ or others), which can be more easily scrubbed from the flue gas in a typical wet scrubber.

The process according to one aspect of the invention includes the following steps:

1. Introducing calcium chloride into the feed about to or undergoing incineration to facilitate formation in situ of hydrochloric acid in the flue gas generated by the sludge incinerator and reacting calcium with water contained in the feed at ambient temperature or at combustor operating temperature and with water in the wet scrubber to produce CaO and/or Ca(OH)2:

$$CaCl2+H_2O \rightarrow 2HCl+CaO \quad (1)$$

$$CaCl2+H_2O \rightarrow 2HCl+Ca(OH)_2 \quad (2)$$

2. Converting gaseous Hg and HCl into $HgCl_2$ by cooling Hg and HCl containing flue gas from typical operating temperature of 850° C. to a temperature of about 450° C.

$$Hg+2HCl+\tfrac{1}{2}O_2 \rightarrow HgCl_2+H_2O \quad (3)$$

The mercury speciation of reaction (3) is favored by low temperature and occurs in the gas phase downstream of the combustor when the temperature starts to drop from tie typical 850° C. to about 450° C. A temperature lower than about 450° C. is acceptable but not desirable, to avoid the temperature zone attributed to the formation of dioxins and furans. Furthermore, since reaction (3) is a rate limited reaction, adequate time is provided for speciation to occur within the favorable temperature window of 850° C. and 450° C.

3. Oxidizing nitrogen monoxide, which comprises the majority of flue gas $NO_x$ to a more soluble form of nitrogen oxides:

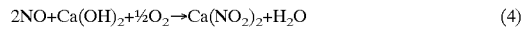
$$2NO+Ca(OH)_2+\tfrac{1}{2}O_2 \rightarrow Ca(NO_2)_2+H_2O \quad (4)$$

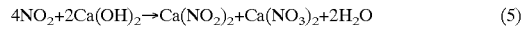
$$4NO_2+2Ca(OH)_2 \rightarrow Ca(NO_2)_2+Ca(NO_3)_2+2H_2O \quad (5)$$

Oxidation reactions (4) and (5) or other similar reaction can occur either in the gas phase or in the liquid phase of the wet scrubber. Excess calcium chloride fed to the Fluid Bed Combustor (FBC) or calcium oxide and calcium hydroxide generated from equations (1) and (2) increase the alkalinity and the pH of the wet scrubber water. A high pH of the scrubber water is favorable to the removal of both mercury and nitrogen oxides.

4. Quenching the soluble $HgCl_2$ and $NO_x$ containing flue gas to about 70° C.–90° C. with water. The pollutants will be absorbed in the liquid phase and separated from the flue gas.

5. Cooling the flue gas to about 45–50° C. with water to improve the absorption and the separation of the pollutants as described in step #4.

6. Further cooling the flue gas to ambient temperature or lower to condense and separate fugitive Hg from the flue gas.

In another aspect, the invention relates to a process for removing Hg from combustion flue gas generated by combustion of carbonaceous material. The steps include: introducing into the sludge a chlorine containing substance to facilitate formation of hydrochloric acid in the flue gas generated by the combustor; converting gaseous Hg and HCl into $HgCl_2$ by cooling from combustor operating temperature Hg and HCl containing flue gas to a temperature of about 450° C.; quenching the $HgCl_2$ containing flue gas to about 70–90° C.; separating Hg in the form of $HgCl_2$ from the flue gas; cooling the flue gas in the presence of water to about 45–50° C; removing residual $HgCl_2$ and condensed water vapor from the flue gas; condensing fugitive elemental Hg by contacting the flue gas with further cooling water to reduce flue gas temperature to substantially ambient or lower temperature; and separating any condensed fugitive elemental Hg from the flue gas.

In another aspect, the invention relates to a process for reducing $NO_x$ emissions generated by combustion of carbonaceous material. The steps include: introducing into the carbonaceous material about to or undergoing combustion an alkali earth metal containing substance; reacting alkali earth metal (M) in the alkali earth metal containing substance with water contained in the feed at ambient temperature or at combustor operating temperature and with water in the wet scrubber to produce MO and/or $M(OH)_2$; reacting MO and/or $M(OH)_2$ with $NO_x$ in the combustor to produce $M(NO_2)_2$ and/or $M(NO_3)_2$; and separating water and $M(NO_2)_2$ and/or $M(NO_3)_2$ from flue gases generated by the combustor.

The invention and the advantages provided thereby will be more fully understood with the reference to the following detailed description of the preferred embodiment taken in conjunction with the accompanying drawings.

BRIEF DESCRIPTION OF THE DRAWINGS

FIG. 3 is a graph of the reduction in Hg emissions as the flue gas temperature decreases.

FIG. 4 is a graph of Hg emission and Hg removal efficiency versus HCl contained in incinerator off gas.

FIG. 5 is a graph showing $NO_x$ emissions during normal operating conditions.

FIG. 6 is a graph similar to FIG. 5 except that calcium chloride has been added to the feed sludge.

FIG. 7 is a graph showing $NO_x$ emissions and oxygen content of the flue gas recorded versus time at the injection of $CaCl_2$.

DETAILED DESCRIPTION OF THE INVENTION

Figure 1:
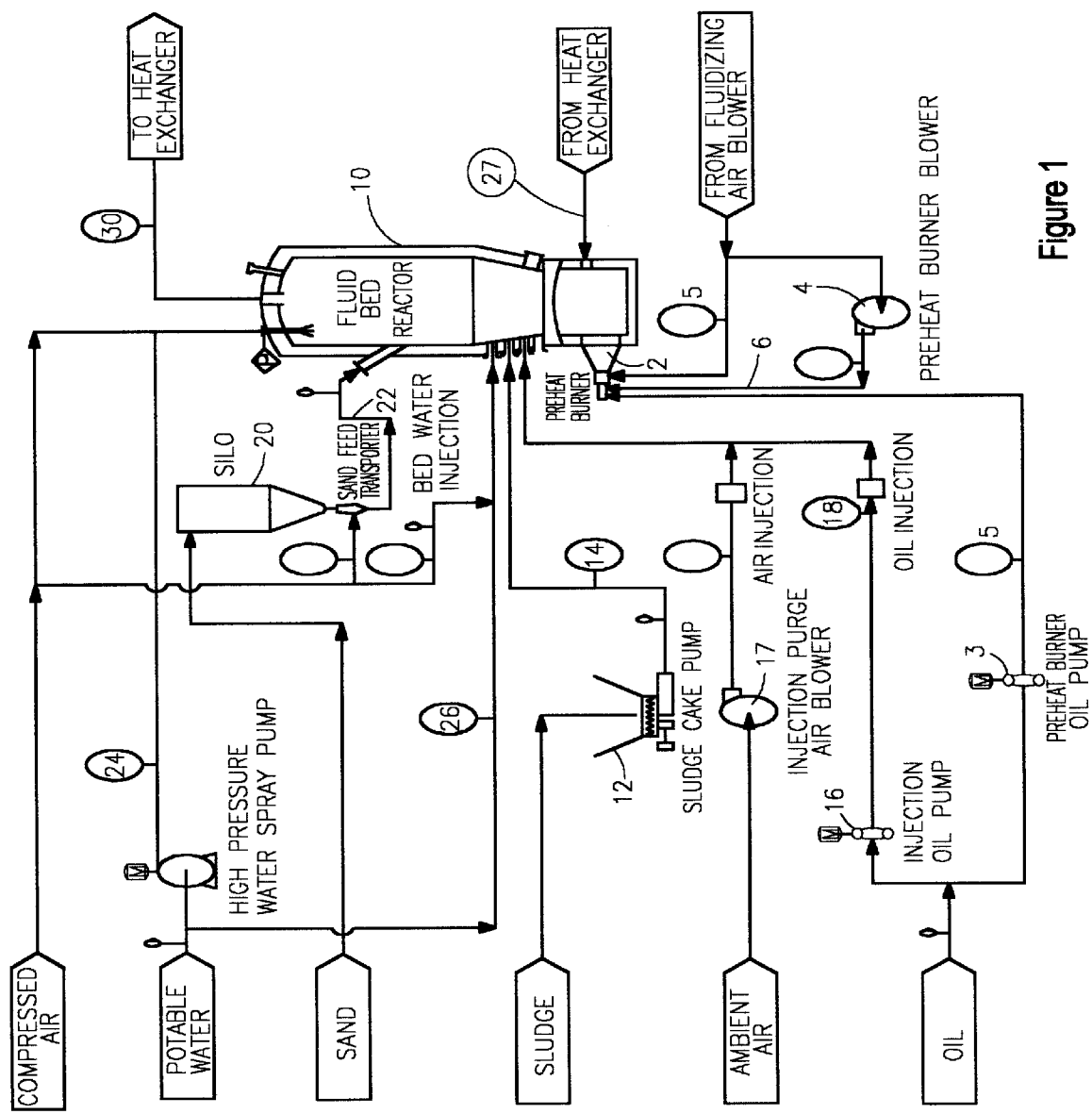
FIG. 1 shows a schematic of a first portion of a system used in accordance with the invention including a fluid bed reactor and a feed system for introducing sludge therein.

The following description is intended to refer to specific embodiments of the invention illustrated in the drawings and is not intended to define or limit the invention, other than in the appended claims. Also, the drawings are not to scale and various dimensions and proportions are contemplated.

Figure 2:
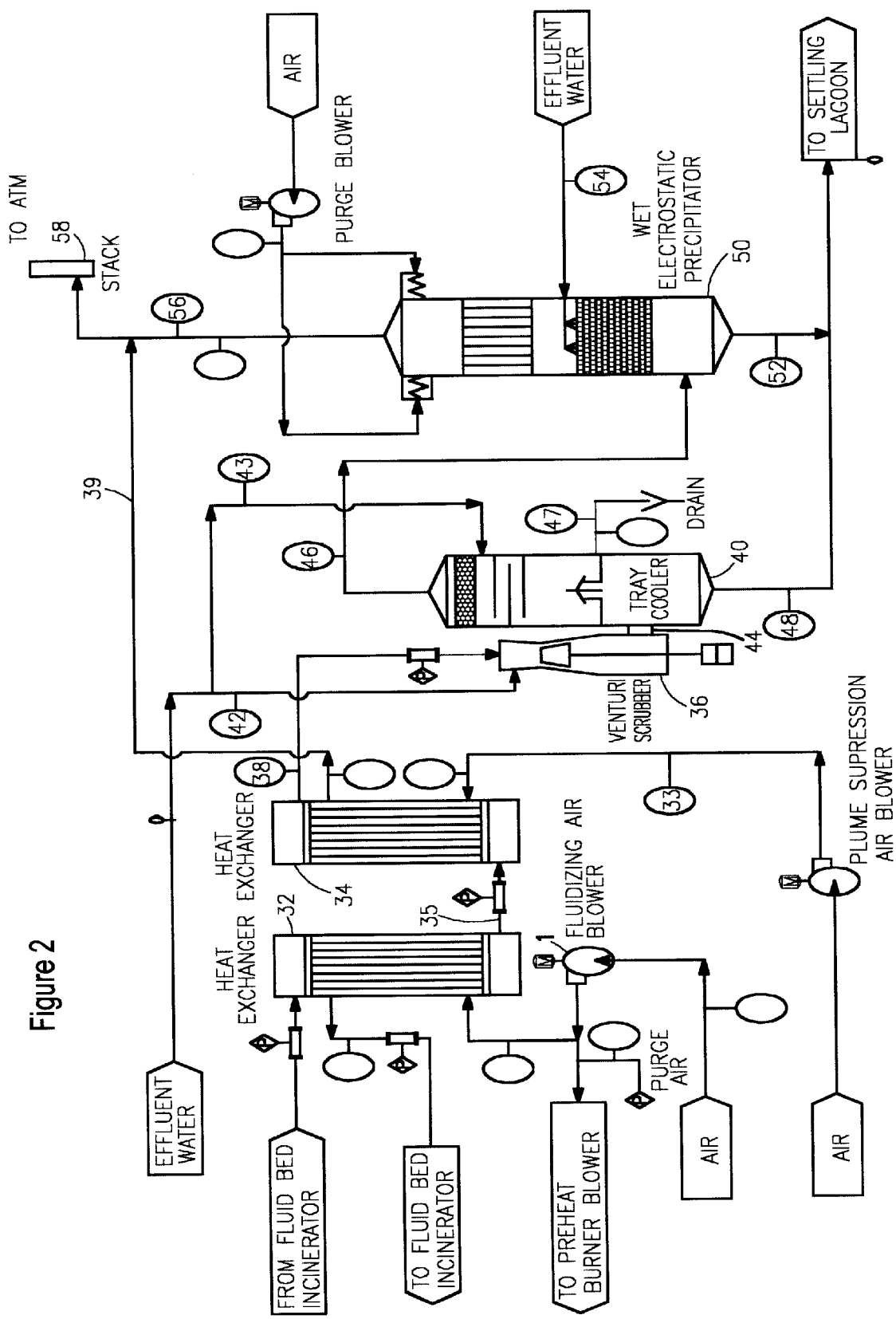
FIG. 2 is a schematic of a system used in accordance with the invention that connects to the system in FIG. 1, including two heat exchangers, venturi scrubber, tray cooler and wet electrostatic precipitator.

Referring to the drawings in general and FIGS. 1 and 2 in particular, a preferred apparatus for employing the method of the invention is shown. FIG. 1 contains a portion of the system that can be considered the upstream portion and FIG. 2 contains the portion of apparatus that can be considered the downstream portion.

Referring specifically to FIG. 1, there is a high temperature fluid bed combustor (FBC) 10 which receives feed from a feeding device 12 and an associated connection line 14. The feed can be any waste stream, solid, liquid or sludge known in the art. The FBC 10 is also fueled in part by fuel oil, such as No. 2 fuel oil, by way of injector oil pump 16 and the associated oil feed connection line 18. Air is provided by way of injection air blower 17 to atomize the fuel oil in the FBC 10. Of course, other fuel types may be used as desired. Combustion/Fluidization air is introduced through line 27. Sand is introduced into the FBC 10 by way of a sand silo 20 and associated connection line 22. Water may be injected into the FBC 10 by way of line 24 for off gas temperature control and/or line 26 for bed temperature control. At start-up, a preheat burner 2 installed in the lower part of the FBC 10 is used to provide heat, using oil or other fuel provided by way of the preheat burner oil pump 3. Air is provided to this burner 2 through line 6, by preheat blower 4, and through line 5, by fluidizing air blower 1.

Flue gases and any suspended fly ash at typical operating temperature of 850° C. exit the FBC 10 through line 30 which connects to a heat exchanger 32 as shown in FIG. 2.

In the embodiment shown in FIG. 2, there are two separate, but connected heat exchangers 32 (primary heat exchanger) and 34 (secondary heat exchanger). The primary heat exchanger 32 is to preheat the combustion/fluidizing air, provided by way of fluidizing air blower 1, to typically about 650° C. The secondary heat exchanger 34 is to heat the plume suppression air to about 250° C. The exhaust gas temperatures at the primary heat exchanger 32 and the secondary heat exchanger 34 outlets are about 550° C. and about 450° C., respectively. The heat exchanger 32 connects to heat exchanger 34 directly through connection line 35. Heat exchanger 34 connects to venturi scrubber 36 by way of connection line 38. Plume suppression air is introduced to the secondary heat exchanger 34 through connection 33, and sent via connection 39 to mix with clean gas at the wet electrostatic precipitator (WESP) 50 via connection 56, and exit the stack.

Flue gases enter an upper portion of venturi scrubber 36 through connection 38 and quenching water is introduced through line 42 into an upper portion of venturi scrubber 36. The quenched flue gas temperature at the venturi scrubber 36 outlet is about 70° C.–90° C. An outlet 44 transfers the contents of venturi scrubber 36 into a lower portion of tray cooler 40. The excess water and fly ash from the venturi scrubber 36 exit the lower portion of the tray scrubber through connection 48. Flue gases exit an upper portion of tray cooler 40, in which cooling water is injected through connection 43. Cooling water condenses the majority of the water vapor in the flue gas and exits the tray cooler 40 through connection 47. The flue gas exit the tray cooler 40 through connection 46 at typically about 45° C.–50° C.

Flue gases pass through connection 46 into wet electrostatic precipitator (WESP) 50. Cooling water is introduced into a middle portion of the WESP 50 through connection 54 to wet and cool the flue gas further down to ambient temperature or lower. The flue gas passes through an upper portion of the WESP 50 and outwardly thereof through connection 56, which leads to a stack 58, in which hot air is added through connection 39 and to the ambient atmosphere. Cooling water and any condensed fugitive Hg pass out of a bottom portion of the WESP 50 through connection 52.

EXAMPLES

A preferred method of operation of the preferred apparatus as shown in FIGS. 1 and 2 and as described above is set forth below in connection with a series of tests that describe the present invention. These tests were conducted on a full-scale FBC used for the incineration of municipal sewage sludge at the North West Bergen County Utilities Authority (N.J., USA). The residence time of the flue gas in the two heat exchangers 32 and 34, including duct 38 from the secondary heat exchanger 34 to the venturi scrubber 36, was 1 second. The FBC was operated at 1 metric ton of dry solids per hour. The feed sludge was a mixture of 50% primary sludge and 50% waste activated sludge that was dewatered to approximately 20%–22% dry solids. Sludge and auxiliary fuel ultimate analyses and the gas chemical compositions at different test ports were in accordance with accepted EPA Methods.

1. Effect of Temperature on Hg Emission:

The effect of temperature on mercury emissions was investigated during two series of tests (test #1 and #2). The results are presented in FIG. 3. During these tests, Hg emissions were measured simultaneously at two locations along the gas stream: inlet 35 to secondary heat exchanger 34, and outlet 56 of WESP 50. The duration of each test was one hour. The average temperature at these two locations was 518° C., and 21° C., respectively. The operating conditions recorded during each test are very similar and presented in Table 1.

Since the temperature at the inlet 35 to the secondary heat exchanger 34 was higher than the boiling point of Hg (357° C. at 1 atm), the concentration of Hg at this point was assumed to equal the total quantity of Hg entering the FBC. Measurements at the other location provided the amount of Hg removed from off gas due to condensation at that temperature. As shown in FIG. 3, when the flue gas was cooled to 21° C., the concentration of mercury in the flue gas dropped from 116 [$\mu$g/dscm] to 85 [$\mu$g/dscm]. Approximately 27% of the Hg was removed predominantly by condensation.

2. Effect of Calcium Chloride on Hg Emission:

The effect of calcium chloride addition is shown in FIG. 4, in which Hg emissions and the removal efficiency are plotted versus the concentration of HCl in the flue gas. Three different flow rates of $CaCl_2.2H_2O$ (9 kg/hr, 26 kg/hr and 42 kg/hr) were added directly to the sludge hopper 12 by using a calibrated auger. The calcium chloride used was in the form of white flakes, and is a safe commercially available product, typically used for road de-icing. To ensure that the system was stabilized and that FBC 10 was actually receiving the correct flow of calcium chloride, measurements were started at least 30 minutes after any change in feed rate. Again, Hg emissions were measured at the inlet 35 to secondary heat exchanger 34 and the outlet 56 of WESP 50, substantially simultaneously, and the length of each test was one hour. The concentration of HCl in the flue gas are calculated values based on the added $CaCl_2$ feed rate, and the chlorine naturally present in the sludge fed to the FBC. A summary of the operating conditions and the results are also presented in Table 1 (test #3, #4 and #5).

The removal of Hg increased from 27% to approximately 52% (50–54%) or an average of 52 [$\mu$g/dscm], with the addition of calcium chloride, as shown in FIG. 4. This increase in Hg removal demonstrates the positive and unexpected effect of calcium chloride on removing Hg. We accordingly believe, but do not wish to be bound by a particular theory, that reactions 1, 2 and 3 set forth in the summary of the invention occur at this point.

3. Effect of Calcium Chloride on $NO_x$ Emissions:

Under normal operating conditions the $NO_x$ emissions for this system ranged from 30 to 75 [ppmv $NO_x$; dry gas @ 7% $O_2$]. FIG. 5 shows data from two different days of normal operation. Each point represents an average of one hour of stack gas emission data measured at the flue gas outlet 56 of the WESP 50.

During the above mentioned tests when calcium chloride was added to the feed sludge, the $NO_x$ emissions were reduced to a range of 25 to 35 [ppmv $NO_x$; dry gas @ 7% $O_2$]. FIG. 6 shows data during the tests with calcium chloride addition; again each point represents an average of one hour of stack gas data, measured at the flue gas outlet of the WESP 56.

FIG. 7 shows $NO_x$ and $O_2$ emission data from before and after the start of calcium chloride addition. On this Figure each point represents a one-minute average, measured at the flue gas outlet 56 of the WESP 50. The $NO_x$ concentration follows the same trends as the $O_2$%, up until 9:15 am, which demonstrates the influence of excess air (here measured as $O_2$%) on $NO_x$. The peak in $O_2$% (from 8:15 to 8:35 am) was due to a sudden and temporary drop in oil feed. As the excess air increases the formation of $NO_x$ also increases; this is a well-documented relationship. However, after the addition of $CaCl_2$ there was a deviation in the relation between the $NO_x$ and $O_2$% (seen after 9:15 am). Even though $O_2$% increased, the $NO_x$ decreased. The $NO_x$ concentration decreased from an average value of 48 ppmv (prior to 8:00 am @$O_2$% of 9.0%) to 28 ppmv (after 9:30 am @ $O_2$% of 9.0%).

TABLE 1

Summary of operating conditions and results of Hg tests
All concentrations are based on dry gas, corrected to 7% $O_2$.

| | Temperatures [° C.] | | | | Calculated | Hg Concentrations [$\mu$g/dscm] | | |
| --- | --- | --- | --- | --- | --- | --- | --- | --- |
| Test # | Free board | Inlet 2nd H. Ex. | Outlet WESP | $CaCl_2.2H_2O$ Feed [kg/h] | HCl in fluegas [dppmv] | Inlet 2nd H. Ex. | Outlet WESP | Hg Removal [%] |
| 1 | 861 | 514 | 21 | 0 | 16 | 116.23 | 88.57 | 23.80% |
| 2 | 859 | 521 | 21 | 0 | 58 | 116.91 | 81.93 | 29.92% |
| 3 | 829 | 518 | 20 | 26 | 321 | 116.43 | 58.79 | 49.51% |
| 4 | 837 | 529 | 20 | 9 | 126 | 93.62 | 43.13 | 53.93 |
| 5 | 834 | 529 | 20 | 42 | 524 | 92.77 | 45.09 | 51.40 |

As mentioned previously, $NO_x$ reduction in wet scrubbing is limited without first oxidizing NO to another form. Once oxidized to calcium nitrite and calcium nitrate the products are very soluble in water and can, therefore, be removed in the water in the venturi scrubber 36, tray scrubber 40 or WESP 50. The addition of calcium chloride to the reactor also increases the pH of the venturi scrubber water, which enhances the solubility of $NO_2$ and higher oxidized forms of nitrogen oxides.

Although this invention has been described with reference to specific forms of apparatus and method steps, it will be apparent to one of ordinary skill in the art that various equivalents may be substituted, the sequence of steps may be varied, and certain steps may be used independently of others, all without departing from the spirit and scope of the invention defined in the appended claims.

What is claimed is:

1. A process for removing Hg and $NO_x$ from combustion flue gas generated by combustion of carbonaceous material comprising:
   a) providing said carbonaceous material and at least one additive compound selected from the group consisting of alkali earth metal, chlorine, and mixtures thereof, to a combustor to facilitate formation in situ of HCl acid and MO or $M(OH)_2$ in the flue gas generated by the combustor;
   b) generating excess MO and $M(OH)_2$ in the combustor to increase alkalinity and pH;
   c) converting gaseous Hg and HCl into $HgCl_2$ by cooling Hg and HCl containing flue gas;
   d) converting gaseous NO and MO or $M(OH)_2$ into a more soluble form of nitrogen oxides;
   e) quenching the $HgCl_2$ and the $NO_x$ containing flue gas to about 70–90° C.;
   f) separating Hg in the form of $HgCl_2$ and the soluble form of nitrogen oxides with a majority of ash generated by the combustor from the flue gas;
   g) cooling the flue gas in the presence of water to about 45–50° C.;
   h) removing residual $HgCl_2$ and remaining soluble nitrogen oxides from the flue gas;
   i) condensing fugitive elemental Hg by contacting the flue gas with further cooling fluid to reduce flue gas temperature to substantially ambient temperature or lower; and
   j) separating condensed fugitive elemental Hg from the flue gas.

2. The process of claim 1 wherein the carbonaceous material is sludge.

3. The process of claim 1 wherein cooling the Hg and nitrogen oxides containing flue gas is achieved with one or more heat exchangers downstream from the combustor.

4. The process of claim 3 wherein the heat exchangers provides sufficient time for speciation of mercury to occur while cooling the flue gas at a low temperature but high enough to avoid the reformation of dioxins and furans.

5. The process of claim 1 wherein quenching is performed in a venturi scrubber, precooler or wet scrubber.

6. The process of claim 1 wherein excess additive is fed to the combustor to further increase the alkalinity and the pH to remove both mercury and nitrogen oxides.

7. The process of claim 1 wherein the fly ash is separated from the $HgCl_2$ containing flue gas along with the $HgCl_2$ and soluble nitrogen oxides.

8. The process of claim 1 wherein a cooling tray column or packed bed scrubber cools the flue gas to about 45° C.–50° C. to further absorb mercury and nitrogen oxides.

9. The process of claim 1 wherein condensing fugitive elemental Hg is performed at ambient temperature, or lower, in a wet electrostatic precipitator.

10. The process of claim 1 wherein said more soluble form of nitrogen oxides is $Ca(NO_2)_2$ and/or $Ca(NO_3)_2$.

11. A process for removing Hg from combustion flue gas generated by combustion of carbonaceous material comprising:
    a) providing said carbonaceous material and a chlorine containing substance to a combustor to facilitate formation of HCl acid in the flue gas;
    b) converting gaseous Hg and HCl into $HgCl_2$ by cooling Hg and HCl containing flue gas;
    c) quenching the $HgCl_2$ containing flue gas to about 70°–90° C.;
    d) separating Hg in the form of $HgCl_2$ from the flue gas;
    e) cooling the flue gas in the presence of water to about 45°–50° C.;
    f) removing residual $HgCl_2$ and condensed water vapor from the flue gas;
    g) condensing fugitive elemental Hg by contacting the flue gas with further cooling fluid to reduce flue gas temperature to substantially ambient temperature or lower; and
    h) separating condensed fugitive elemental Hg from the flue gas.

12. The process of claim 11 wherein the chlorine containing substance is selected from the group consisting of calcium chloride, ferric chloride and polyvinyl chloride.

13. The process of claim 11 wherein cooling of the Hg and HCl containing flue gas is in a heat exchanger downstream from the combustor.

14. The process of claim 11 wherein quenching is performed in a venturi scrubber, precooler or wet scrubber.

15. The process of claim 14 wherein the $HgCl_2$ containing flue gas also contains suspended fly ash.

16. The process of claim 15 wherein the fly ash is separated from the $HgCl_2$ containing flue gas along with the $HgCl_2$.

17. The process of claim 11 wherein a cooling tray column or packed bed scrubber cools the flue gas to about 45°–50° C.

18. The process of claim 11 wherein condensing fugitive elemental Hg is performed in a wet electrostatic precipitator.

19. The process of claim 11 wherein a collecting electrode plate separates condensed fugitive elemental Hg.

20. The process of claim 11 wherein the chlorine containing substance is added to the carbonaceous material prior to introducing the carbonaceous material to the combustor.

21. The process of claim 11 wherein the carbonaceous material is sludge.

22. The process of claim 11 wherein the Hg and HCl containing flue gas is cooled from combustor operating temperature to about 450° C.

23. A process for reducing $NO_x$ containing flue gas generated by combustion of carbonaceous material comprising:
    a) providing said carbonaceous material and alkali earth metal containing substance for a combustor to facilitate formation in situ of MO or M(OH);
    b) generating excess MO and $M(OH)_2$ in the combustor to increase alkalinity and pH;
    c) converting gaseous NO and MO or $M(OH)_2$ into a more soluble form of nitrogen oxides; and d) quenching the $NO_x$ containing flue gas to about 70–90° C.;
e) separating the soluble form of nitrogen oxides with a majority of ash generated in the combustor from the flue gas;
f) cooling the flue gas in the presence of water to about 45–50° C.; and
g) removing remaining soluble nitrogen oxides from the flue gas.

24. The process of claim 23 wherein said more soluble form of nitrogen oxides is $Ca(NO_2)_2$ and/or $Ca(NO_3)_2$.

25. The process of claim 23 wherein quenching is performed in a venturi scrubber, precooler or wet scrubber.

* * * * *